United States Patent [19]

Potter

[11] Patent Number: 5,146,753
[45] Date of Patent: Sep. 15, 1992

[54] TURBOCHARGED INTERNAL COMBUSTION ENGINE HAVING REDUCED HIGH SPEED EMISSIONS

[75] Inventor: Michael A. Potter, Livonia, Mich.
[73] Assignee: General Motors Corporation, Detroit, Mich.
[21] Appl. No.: 553,018
[22] Filed: Jul. 16, 1990
[51] Int. Cl.$^5$ .............................. F02B 37/00
[52] U.S. Cl. ......................... 60/602; 415/146
[58] Field of Search ............. 60/600, 601, 602, 603; 415/146

[56] References Cited

U.S. PATENT DOCUMENTS

| | | | |
|---|---|---|---|
| 3,217,487 | 11/1965 | Rothe | 60/602 |
| 4,098,085 | 7/1978 | McDowell | 60/600 |
| 4,254,625 | 3/1981 | Bergstedt et al. | 60/602 |
| 4,463,564 | 8/1984 | McInerney | 60/602 |
| 4,505,117 | 3/1985 | Matsuoka | 60/609 |

FOREIGN PATENT DOCUMENTS 160526  7/1986  Japan ...................... 60/602

*Primary Examiner*—Michael Koczo
*Attorney, Agent, or Firm*—Karl F. Barr, Jr.

[57] ABSTRACT

An internal combustion engine system having reduced high speed emissions comprising an exhaust driven supercharger having turbine pressure dependent control means for regulating turbine pressure and turbine speed to a substantially constant value to produce a decreasing compressor pressure profile with increasing engine speed and to reduce mass air flow through the engine during high speed operation, thereby reducing engine emissions and improving durability.

1 Claim, 4 Drawing Sheets

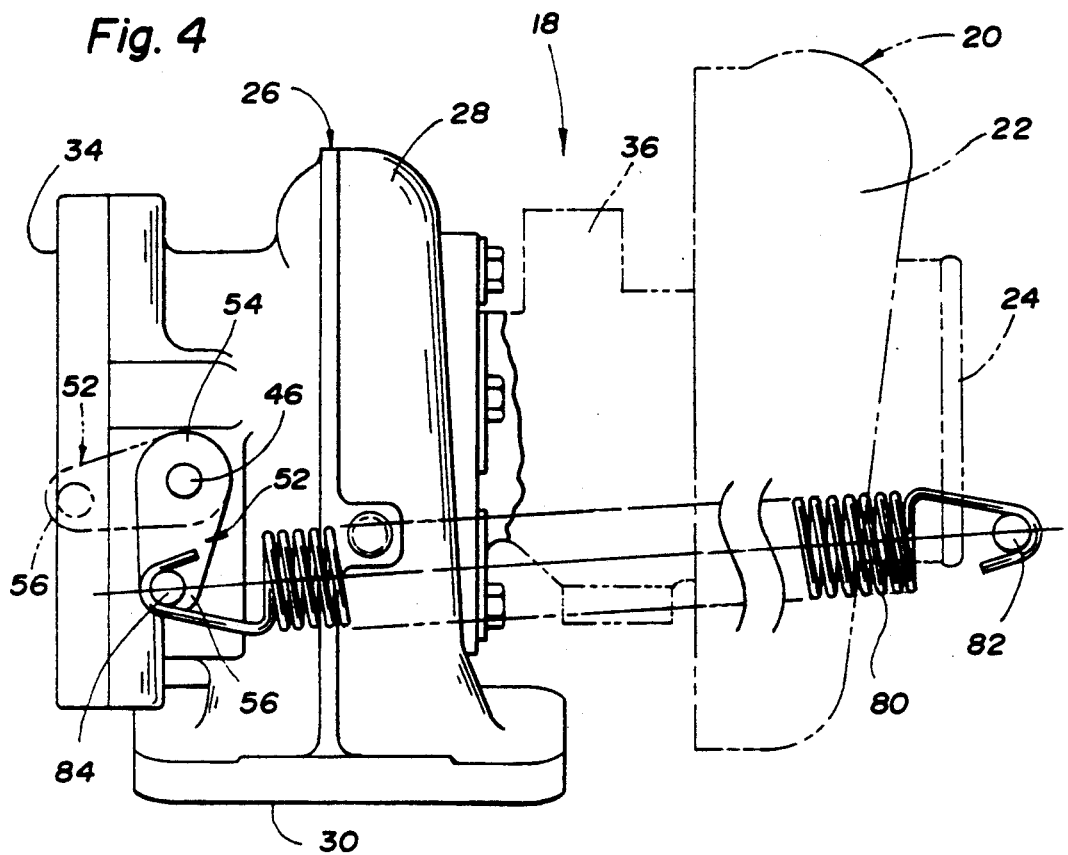
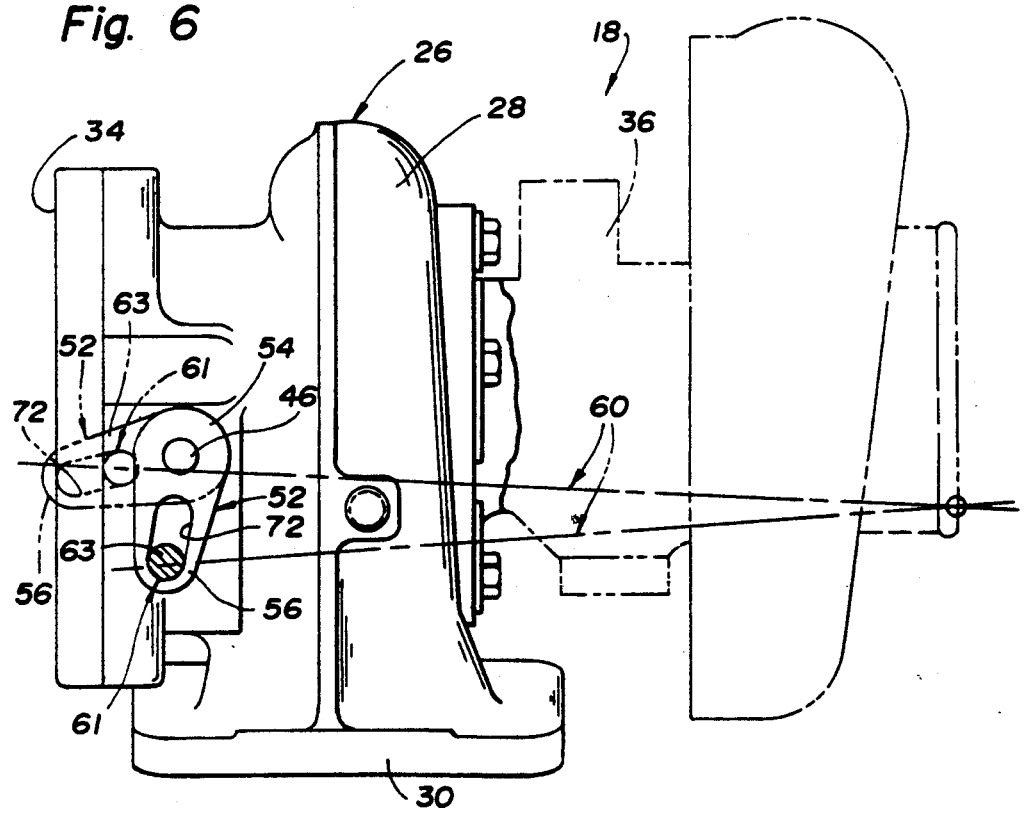

TURBOCHARGED INTERNAL COMBUSTION ENGINE HAVING REDUCED HIGH SPEED EMISSIONS

BACKGROUND OF THE INVENTION

1. Field of the Invention

The present invention relates to a turbocharged internal combustion engine having reduced high speed emissions and, more particularly to an exhaust driven supercharger having turbine inlet pressure dependent control means for regulating the compressor pressure profile.

2. Description of the Relevant Art

Due to the broad speed range of automotive internal combustion engines, exhaust-gas driven superchargers, or turbochargers, must be regulated in order to achieve desired charge-air pressures over wide ranging engine speeds. Important factors in the design of such systems are cost, reliability and performance. As a result, the design should be simple. Conventional turbocharger systems supply boost to the engine at a progressively increasing rate until a maximum level is attained; normally in the area of peak engine torque, see curve "C" of FIG. 2. It is at this level of operation where the increase in charge density is most useful. Once maximum compressor pressure out, or boost is achieved, it is regulated to a constant value by a compressor pressure dependent wastegate. Maintenance of the compressor pressure at a constant value results in an increasing turbine pressure profile.

Conventional design turbochargers generally maintain maximum boost as engine speed increases along a declining torque curve, resulting in high mass air flow and high average peak cycle pressure during operating conditions which benefit little from these conditions. It is generally recognized that NOx emissions are related to total engine air flow during high speed, part-load conditions. Also, durability is closely related to the average peak cycle pressure that the engine is exposed to throughout its life. As the average peak cycle pressure is increased, engine component durability suffers.

In order to obtain the best compromise between engine emission performance, engine performance, and engine durability, it is desirable to apply turbocharger boost only during operating conditions that benefit from additional charge density.

SUMMARY OF THE INVENTION

In accordance with the present invention, an internal combustion engine is disclosed for use in automotive applications having an exhaust driven supercharger, or turbocharger, for compressing the air being supplied to the engine. The turbocharger compressor pressure is regulated using turbine inlet pressure dependent control means which maintain incoming turbine pressure at a substantially constant or decreasing value once maximum boost is reached, thereby achieving a decreasing compressor pressure profile as engine speed increases. Specifically, compressor pressure is allowed to increase until peak engine torque is reached at which time the supplied boost is being utilized at optimal conditions. As engine speed further increases along a declining torque curve, compressor pressure decreases due to the maintenance of substantially constant, or decreasing turbine pressure resulting in lower mass air flow through the engine relative to a conventional system and, consequently, reduced NOx emissions and increased durability.

BRIEF DESCRIPTION OF THE DRAWINGS

FIG. 4 is a partial side view of a second embodiment of the present invention;

FIG. 6 is a partial side view, of a fourth embodiment of the present invention.

DESCRIPTION OF THE PREFERRED EMBODIMENTS

Figure 1:
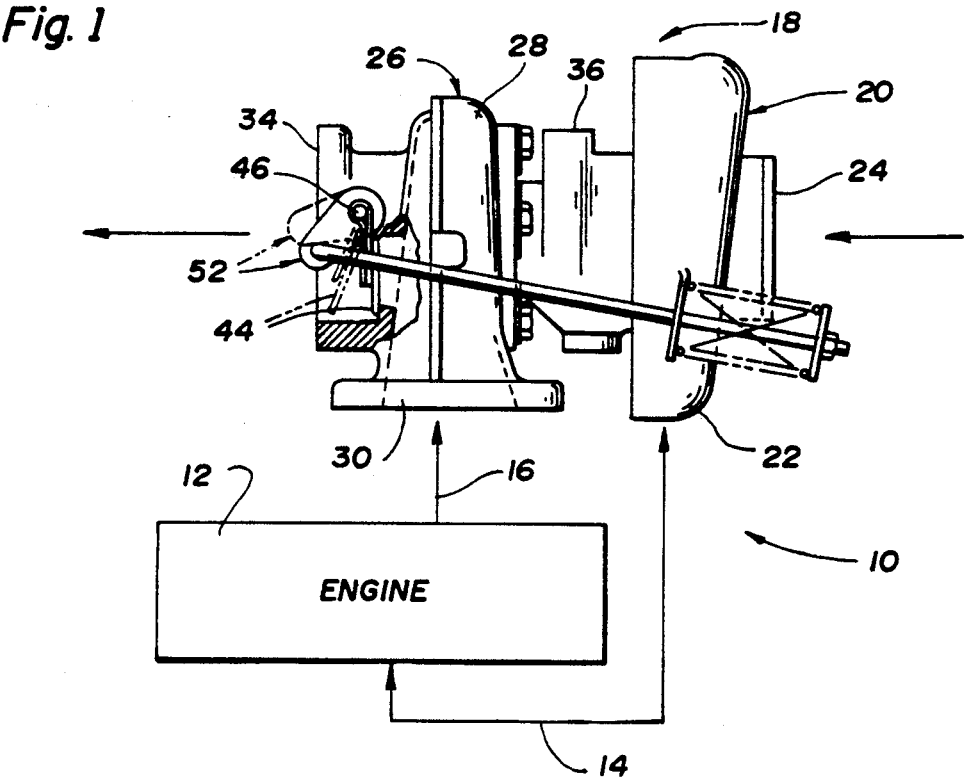
FIG. 1 is a schematic view of an internal combustion engine system embodying the present invention.

In FIG. 1 there is shown an internal combustion engine system, designated generally as 10, comprising a diesel engine 12, having intake and exhaust manifolds 14 and 16 respectively, and an exhaust driven supercharger, or turbocharger, 18 connected thereto, in a well known manner, for compressing the air charge to the engine intake.

The turbocharger 18 has a compressor portion 20, comprising a housing 22, an inlet 24 for intake of low pressure air, an impeller (not shown) disposed within housing 22 for compressing the incoming air, and an outlet (not shown) in communication with intake manifold 14 through which the compressed air charge from the turbocharger is transferred to engine 12. Additionally, turbocharger 18 has a turbine portion 26, comprising a housing 28, an inlet 30 in communication with exhaust manifold 16 for channeling exhaust gas exiting engine 12 into turbine portion 26, an impeller 32 (see FIG. 3b) disposed within housing 28 which is acted upon by the exhaust gas passing through turbine portion 26, and an outlet 34 for directing the exhaust gas to the atmosphere. The turbine impeller 32 is connected to the compressor impeller by an impeller shaft (not shown) disposed in shaft housing 36.

In operation, exhaust gas exiting engine 12 through exhaust manifold 16 enters turbine portion 26 through inlet 30 where it causes turbine impeller 32 to rotate as it passes through housing 28 and exits through outlet 34. As a result of the mechanical coupling of turbine impeller 32 with the compressor impeller through the impeller shaft, the compressor impeller is caused to rotate thereby compressing air entering compressor housing 22 through inlet 24 and forcing the compressed air charge through intake 14 to engine 12. As engine speed and load increases, turbine inlet pressure rises, resulting in an increase in turbine speed, and compressor pressure.

Figure 3A:
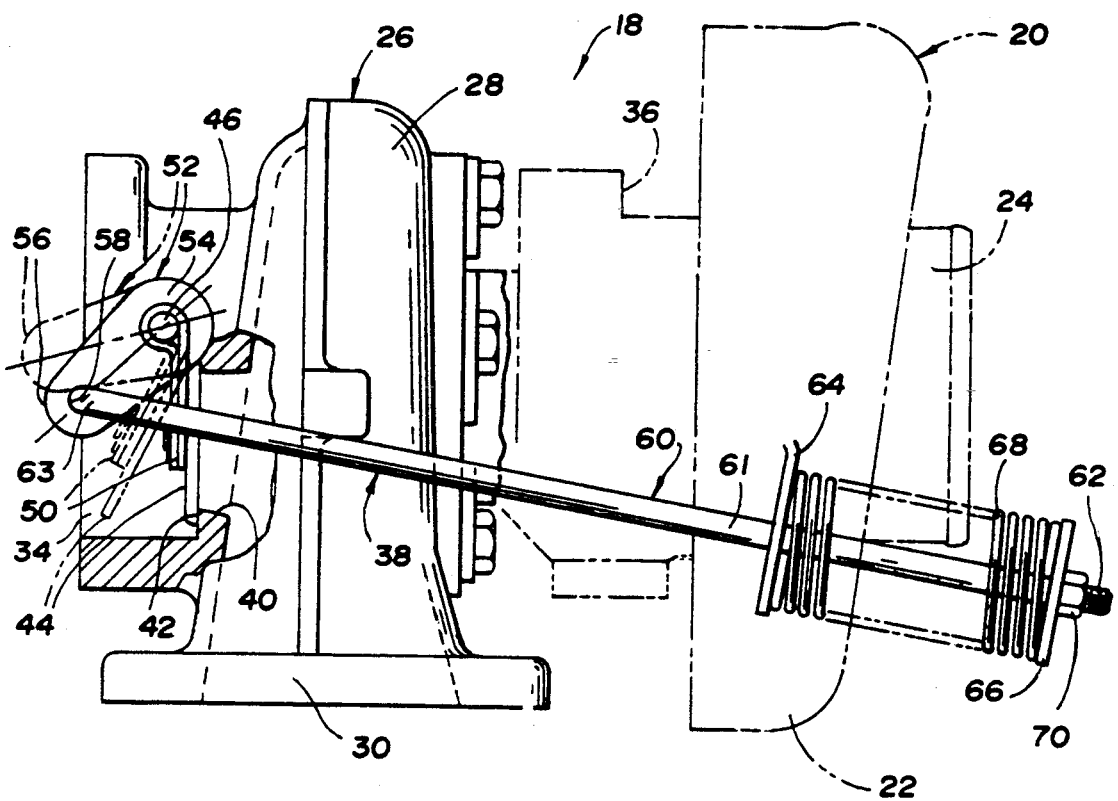
FIGS. 3a and 3b are side and end views respectively, partially in section, of a first embodiment of the present invention.
Figure 3B:
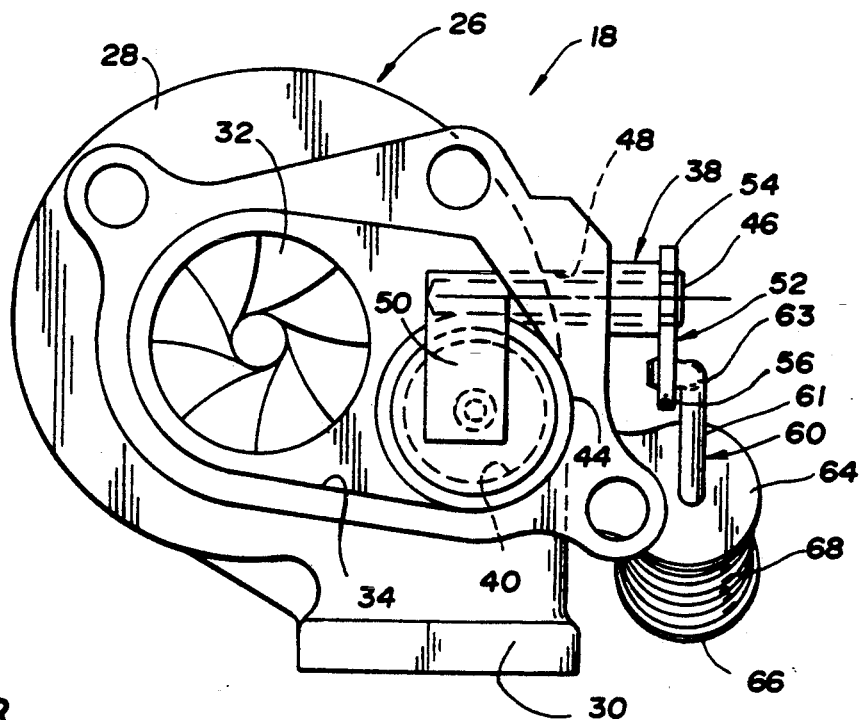

To limit turbine speed and compressor pressure as turbine inlet pressure continues to rise, a wastegate assembly, see FIGS. 3a and 3b, is incorporated into turbocharger 18. The wastegate assembly comprises a turbine bypass 40, extending between turbine inlet 30 and the outlet 34, for channeling exhaust gas around impeller 32. A valve seat 42 surrounds the outlet of bypass 40 and a valve member 44 is disposed within turbine outlet 34 to engage valve seat 42 thereby closing bypass 40 and regulating the flow of exhaust gas therethrough. Operably connected to valve member 44 through arm 50 is valve shaft 46. The valve shaft 46 extends through and is rotatably supported within opening 48 formed in turbine housing 28. Exhaust valve 44 pivots about the axis of valve shaft 46 as it moves into and out of engagement with valve seat 42. A crank member 52 is fixedly connected to the second end of valve shaft 46. The body of crank member 52 extends radially outwardly from its first end 54 to terminate at a second end 56,which has attaching means, such as aperture 58, formed therein.

To control the operation of valve member 44, a biasing assembly, designated generally as 60, is mounted to supercharger 18 and acts to exert a closing force on the valve member through crank 52 and shaft 46. The biasing assembly shown in FIGS. 3a and 3b has a strut-like configuration comprising a first spring seat 64 which is fixed relative to supercharger 18, a second spring seat 66, opposing the first seat and movable relative thereto, and a compression spring 68 disposed between, and retained by spring seats 64 and 66. A biasing rod 61, having a first end 62 fixedly attached to retaining plate 66 by a fastener, such as nut 70, extends axially through spring 68 and an opening in plate 64 to attach at its second end 63 to aperture 58 of crank member 52.

Figure 2:
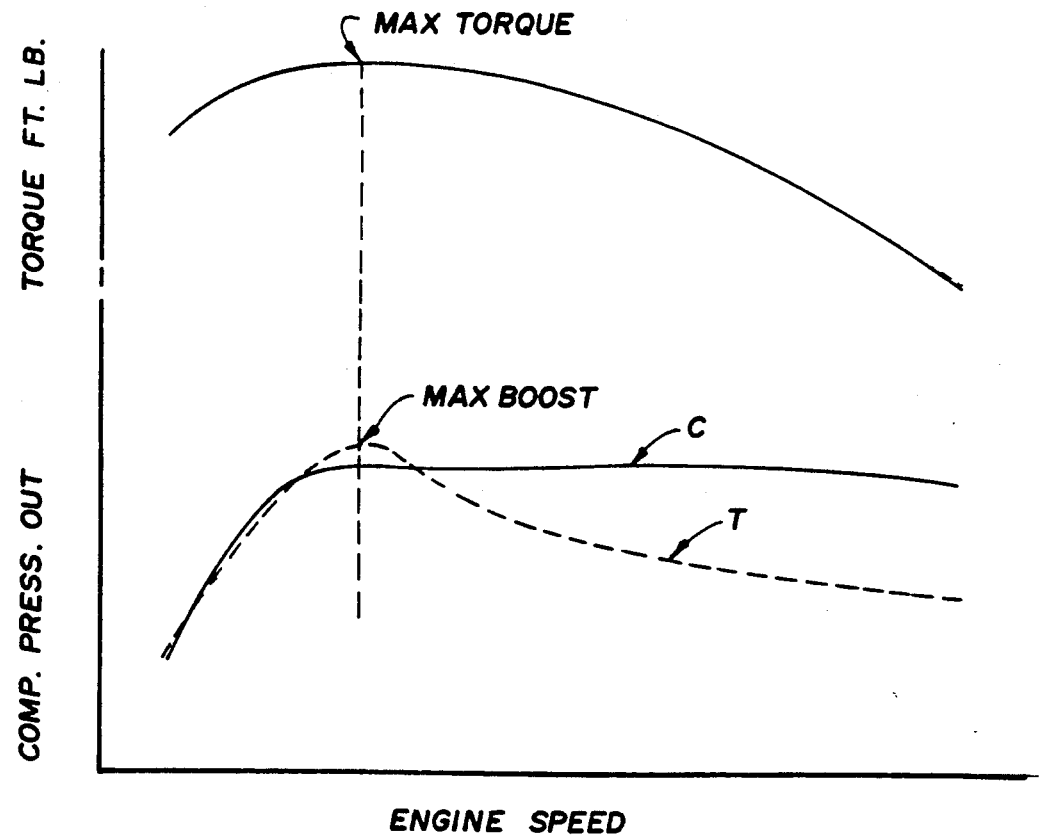
FIG. 2 shows the relationship between engine speed, torque and compressor pressure of conventional engine systems and an engine system embodying the present invention.

In operation, biasing assembly 60 acts through crank member 52 and valve shaft 46 to apply a force on valve 44 which normally urges it into a seated relationship with valve seat 42 thereby preventing the passage of exhaust gas through turbine bypass 40. As exhaust pressure within turbine inlet 30 increases with increasing engine speed, turbine and compressor speed increase thereby supplying increasing compressor pressure to engine 12, as shown in curve "T" of FIG. 2. The rate of spring 68 is selected to maintain valve 44 in a closed position until the turbine inlet pressure reaches a point corresponding to the maximum desired compressor pressure. Upon reaching maximum compressor pressure, the turbine inlet pressure exerts a sufficient opening force on valve 44 to overcome the closing force exerted thereon by biasing assembly 60 and valve 44 begins to pivot about valve stem 46 to open turbine bypass 40, allowing exhaust gas to bypass the turbine impeller, limiting turbine and, consequently, compressor pressure.

Further increases in turbine inlet pressure, corresponding to continually increasing exhaust pressure within turbine inlet 30, will further open valve 44. As the valve opens, it rotates valve shaft 46 and crank member 52 as shown in phantom in FIG. 3a. As crank member 52 rotates, the effective lever arm between the biasing assembly 60 and the valve shaft 46 is reduced, thereby reducing the closing force exerted by biasing assembly 60 on valve member 44. As a result, the valve member is allowed to open at an increasing rate thereby maintaining a substantially constant or declining turbine pressure profile and a decreasing compressor pressure profile as shown in curve T of FIG. 2. The compressor pressure profile can be tailored to specific applications by varying the rate of spring 68 and the dimensions of crank member 52.

To achieve an early, rapid decline in the compressor pressure profile the crank member 52 may be modified as shown in FIG. 6 to include a radially extending slot 72. The slot acts in a manner analogous to that of a lost motion device in that it allows the second end 63 of biasing rod 61 to move along the axis of crank member 52 as the crank rotates (as shown in phantom in FIG. 6). The result of such movement is that as the opening valve member 44 rotates the crank member 52, the point of application of the closing force moves toward the axis of rotation of the crank member to further reduce the effective lever arm between the biasing assembly 60 and the valve shaft 46. Additionally, movement of the second end 63 of biasing rod 61 towards the axis of rotation of crank member 52 reduces the force exerted by the spring member 68 on the crank 52. The result is a substantial decrease in compressor pressure immediately following the achievement of maximum desired boost.

FIG. 4 shows a second embodiment of the present invention. Similar parts of the device retain similar numbers from the above description. In this embodiment, the strut-like configuration of the biasing assembly is replaced by an extension spring 80 having a first end attached to anchor 82, which is fixed relative to turbocharger 18, and a second end attached to the second end 56 of crank member 52. Attachment may be by means of peg 84 which extends outwardly from crank member 52. Operation of this embodiment is the same as that described above for the first embodiment.

Figure 5A:
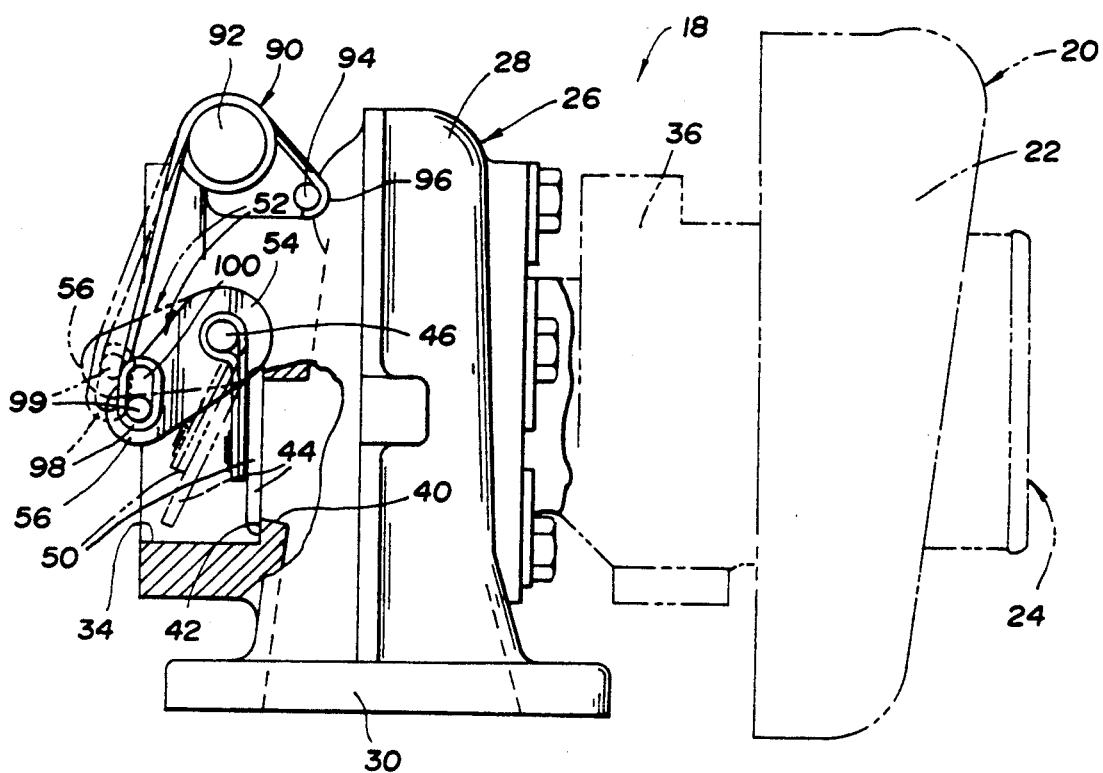
FIGS. 5a and 5b are side and end views respectively, partially in section, of a third embodiment of the present invention.
Figure 5B:
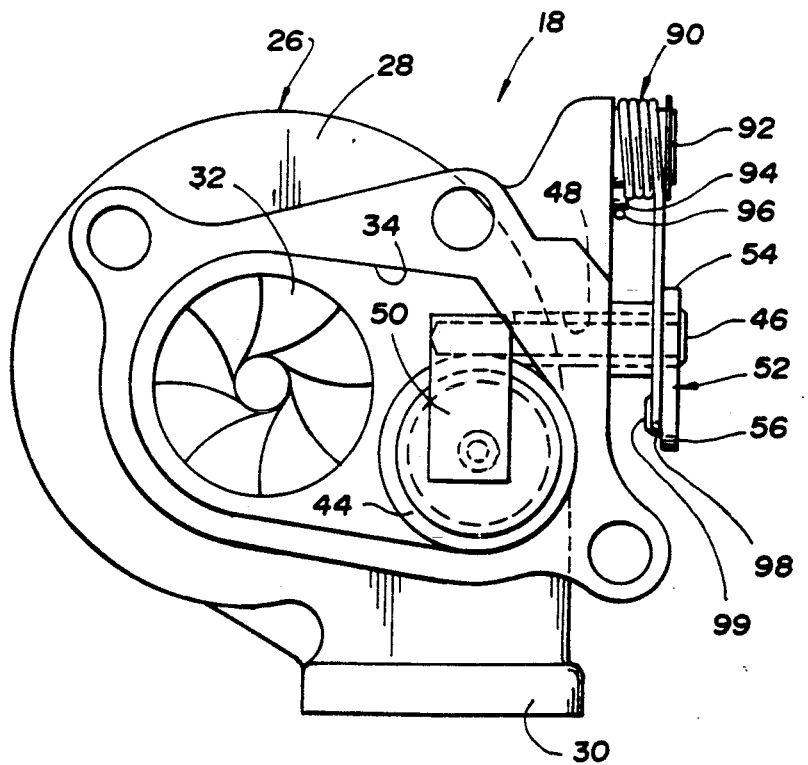

A third embodiment of the present invention is shown in FIGS. 5a and 5b. Similar parts of the device retain similar numbers from the above description. A torsion spring assembly is employed to exert a closing force on valve member 44 through crank member 52 and valve shaft 46. The spring 90 is pivotally supported on retainer 92, with a first end 96 fastened to anchor 94, which is fixed relative to turbocharger 18, and a second end 98 attached to the second end 56 of crank member 52 by attaching means such as peg 99. As shown in FIG. 5a, the second end 98 of torsion spring 90 is configured to form a slot 100 for sliding engagement with peg 99. As turbine inlet pressure reaches a level sufficient to open valve member 44 against the closing force exerted by torsion spring 90, valve member 44 pivots about the axis of shaft 46, as shown in phantom in FIG. 5a. As the crank rotates, peg 99 slides along the axis of slot 100 to change the effective lever arm between the torsion spring 90 and the valve member 44 thereby reducing the closing force exerted by the spring on valve member 44 to produce a decreasing compressor pressure profile as described above. As valve member 44 opens further, the effective lever arm between the spring and the valve member continues to decline.

The turbine pressure actuated turbine bypass disclosed is an economical solution to undesirably high compressor pressure profiles during high speed, low torque engine operation.

The crank-biasing means combination provides a desired reduction in the compressor pressure profile during high speed operations in a simple, inexpensive and reliable package, eliminating the need for expensive electronic control of compressor pressure.

Furthermore, by reducing the compressor pressure at high speed engine operation, NOx and particulate emissions are reduced due to the reduction in mass air flow through the engine while engine durability is increased due to the reduction in average peak cycle pressure.

While certain embodiments of the invention have been described in detail above in relation to a turbocharged internal combustion engine having reduced high speed emissions, it will be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. An exhaust driven supercharger assembly comprising a turbine portion, having a housing with an inlet, an outlet, and an impeller rotatably supported therein, a compressor portion, having a housing with an inlet, an outlet, and an impeller rotatably supported therein, a rotor shaft extending between, and interconnecting said turbine and compressor impellers, and a turbine inlet pressure dependent wastegate apparatus for bypassing exhaust gas entering the turbine around the impeller to limit turbine speed and compressor output, said wastegate apparatus further comprising:

a turbine bypass, extending from said turbine inlet to said turbine outlet;
   a valve member, disposed within the turbine outlet to close said bypass;
   a valve shaft having a first end connected to said valve member and a second end extending through an opening in said turbine housing; and
   valve biasing means comprising a crank member having a first end fixed to said valve shaft, a second end extending radially outwardly therefrom to define a lever arm between said valve shaft and said second end of said crank member, and a strut mechanism having a compression spring positioned between a first retaining plate fixed relative to said turbocharger assembly and a second movable retainer plate, a rod having a first end fixed to said movable retainer plate, and a second end extending axially through said spring and an opening in said fixed retaining plate and coupled to said second end of said crank member for exerting a predetermined closing force on said valve member;
   wherein turbine inlet pressure acts to open said valve member upon overcoming said predetermined closing force, thereby rotating said crank member and moving said rod axially to compress said spring; and
   wherein said lever arm decreases as said valve opens thereby reducing the closing force exerted thereon by said biasing means.

* * * * *